United States Patent
Batra et al.

(10) Patent No.: US 11,039,614 B2
(45) Date of Patent: Jun. 22, 2021

(54) SOLID HERBICIDE COMPOSITIONS CONTAINING FLUROXYPYR-MEPTYL

(71) Applicant: Dow AgroSciences LLC, Indianapolis, IN (US)

(72) Inventors: Ashish Batra, Indianapolis, IN (US); David J. Adrian, Midland, MI (US); Raymond E. Boucher, Jr., Indianapolis, IN (US); Joseph C. Hercamp, New Palestine, IN (US); Hiteshkumar Dave, Audubon, PA (US); Hao Shen, Indianapolis, IN (US)

(73) Assignee: Corteva Agriscience LLC, Indianapolis, IN (US)

( * ) Notice: Subject to any disclaimer, the term of this patent is extended or adjusted under 35 U.S.C. 154(b) by 0 days.

(21) Appl. No.: 16/024,945

(22) Filed: Jul. 2, 2018

(65) Prior Publication Data
US 2018/0310560 A1    Nov. 1, 2018

Related U.S. Application Data

(63) Continuation of application No. 15/296,415, filed as application No. PCT/US2015/057313 on Oct. 26, 2015, now abandoned.

(51) Int. Cl.
| | | |
|---|---|---|
| A01N 43/40 | (2006.01) | |
| A01N 25/30 | (2006.01) | |
| A01N 25/26 | (2006.01) | |
| A01N 59/08 | (2006.01) | |
| A01N 59/02 | (2006.01) | |

(52) U.S. Cl.
CPC .............. *A01N 43/40* (2013.01); *A01N 25/26* (2013.01); *A01N 25/30* (2013.01); *A01N 59/02* (2013.01); *A01N 59/08* (2013.01); *A01N 2300/00* (2013.01)

(58) Field of Classification Search
CPC ........ A01N 25/26; A01N 43/40; A01N 25/30; A01N 59/02; A01N 59/08
See application file for complete search history.

(56) References Cited

U.S. PATENT DOCUMENTS

| | | |
|---|---|---|
| 5,436,223 A | 7/1995 | Mulqueen |
| 2006/0166896 A1 | 7/2006 | Chen |
| 2006/0166898 A1 | 7/2006 | Chen et al. |
| 2009/0111695 A1 | 4/2009 | Jensen |
| 2009/0197765 A1 | 7/2009 | Gaytan |
| 2012/0195974 A1 | 8/2012 | Yadav |
| 2013/0109566 A1 | 5/2013 | Nyaz |
| 2013/0109569 A1 | 5/2013 | Dave |
| 2013/0109725 A1 | 5/2013 | Dave |
| 2013/0190176 A1 | 7/2013 | Dave |

FOREIGN PATENT DOCUMENTS

| | | |
|---|---|---|
| CN | 101438709 | 5/2009 |
| CN | 102239843 | 11/2011 |
| CN | 103141487 | 6/2013 |
| CN | 104068049 | 10/2014 |
| WO | PCT/US15/057313 | 10/2015 |

OTHER PUBLICATIONS

Nordby, D.E. and Hager, A.G., "Herbicide Formulations and Calculations: Active Ingredient or Acid Equivalent?", U. of Illinois Integrated Pest Management, http://weeds.cropsci.illinois.edu/extension/factsheets/aivsae.pdf, downloaded Nov. 23, 2020.
Lewis, K.A., et al, An international database for pesticide risk assessments and management. Human and Ecological Risk Assessment: An International Journal, 22(4), 1050-1064, last updated Oct. 21, 2020: DOI: 10.1080/10807039.2015.1133242. http://sitem.herts.ac.uk/aeru/iupac/Reports/1120.htm, downloaded on Dec. 3, 2020.
Sekisui, Selvol Polyvinyl Alcohol 205 Sales Specification, 2012, https://www.sekisui-sc.com/wp-content/uploads/SelvolPVOH205_ProductSpec.pdf, search date Jul. 1, 2019.

*Primary Examiner* — Mina Haghighatian

(57) ABSTRACT

The present disclosure concerns herbicide granules and powders containing a high-load of fluroxypyr-meptyl. The granules exhibit good storage stability and good herbicidal efficacy when added to water and applied by spray application to control unwanted plant growth.

52 Claims, No Drawings

SOLID HERBICIDE COMPOSITIONS CONTAINING FLUROXYPYR-MEPTYL

CROSS-REFERENCE TO RELATED APPLICATIONS

This application is a continuation of U.S. patent application Ser. No. 15/296,415, which is the National Stage Entry of International Application No. PCT/US15/57313, filed on Oct. 26, 2015, the disclosures of which are both herein incorporated by reference in their entirety.

BACKGROUND

Agrochemical formulations are generally designed based on customer needs and the physicochemical properties of the active ingredients such as their solubility in water or non-aqueous solvents. Agrochemical formulations are prepared as solid formulations or liquid formulations.

Solid agricultural compositions containing pesticidal active ingredients, such as dispersible granule (DG) products, are seeing increased use today because of their relative safety compared to liquid formulations and the advantages they offer with regard to cost savings in packaging and transportation. These products may be used for insect, weed, fungal disease and nematode control.

In some instances, the ability to formulate certain active ingredients as solid formulations may be difficult because the active ingredients have low melting points (e.g., less than about 80-100° C.). The processing of such active ingredients into formulated products and the subsequent storage of these products can be negatively impacted by the presence of these low melting active ingredients.

Many factors play a role in the ability to provide an active ingredient in a specific form or composition. For example, solid formulations such as wettable powders (WP) and dispersible granules (DG) typically require the active ingredient to be in the form of a very small dispersed particle in order to achieve optimal suspensibility in water. Achieving this rather small particle size may require particle size reduction (e.g., grinding), for example, by hammer mill, media mill, air mill, or combinations thereof. When using active ingredients having low melting temperatures, direct grinding of the discrete solid active ingredient can be difficult due to melting or softening of the active ingredient itself during grinding.

The storage stability of solid formulations containing low melting active ingredients in the form of small solid particles can be negatively impacted by the tendency of the solid particles to soften, and then coalesce or agglomerate into larger particles. Such physical instability can lead to solid formulations that do not disperse well in water and form unstable suspensions that deliver substandard biological efficacy on targeted pests after spray application.

Fluroxypyr-meptyl is an herbicide active ingredient that has been largely limited to use in liquid formulations (i.e., emulsifiable concentrates) due to its low melting point (58-60° C.) and tendency for crystallization and particle size growth. There exists a need for solid formulations of fluroxypyr-meptyl that do not have the stability issues often observed with solid formulations of low-melting actives. Disclosed herein are compositions and methods related to solid compositions containing fluroxypyr-meptyl. Such compositions exhibit improved stability and excellent dispersibility in water when compared to existing solid compositions containing fluroxypyr-meptyl.

SUMMARY

High-load herbicide granules containing fluroxypyr-meptyl and methods of making and using thereof are described herein. The granules, such as water dispersible granules, are prepared by processing a powder, such as a coated powder or a dry milled powder, into the granules. The coated powder may be a spray dried powder. In some embodiments, the water dispersible granules include: (1) crystalline particles of fluroxypyr-meptyl coated with a mixture of a nonionic surfactant and an anionic surfactant, (2) a particle agglomeration suppressant, and (3) optionally, additional inert ingredients. The water dispersible granules may include additional active ingredients. The water dispersible granules are stable during storage and readily disperse in water to form a spray solution that exhibits good biological efficacy when used to control unwanted plant growth. Methods of using the high-load herbicide granules that are water dispersible granules for control of unwanted plant growth are also described.

DETAILED DESCRIPTION

High-load herbicide granules containing fluroxypyr-meptyl and methods of making and using thereof are described herein. The granules, such as water dispersible granules, are prepared by processing a powder, such as a coated powder or a dry milled powder, into the granules. The coated powder may be a spray dried powder. The water dispersible granules are stable during storage and readily disperse in water to form a spray solution that exhibits good biological efficacy when used to control unwanted plant growth.

The water dispersible granules include: (1) crystalline particles of fluroxypyr-meptyl coated with a mixture including a nonionic surfactant and an anionic surfactant, (2) a particle agglomeration suppressant, and (3) optionally, additional inert ingredients. The water dispersible granules may include additional active ingredients.

I. Definitions

"Coated particles," as used herein, refers to crystalline fluroxypyr-meptyl particles that contain a coating or a material deposited on their surface. Such coated particles are not prepared by an interfacial, polycondensation, microencapsulation process whereby oil soluble and water soluble monomers react at the interface of an oil-in-water emulsion to form a polymeric wall or shell of a microcapsule that encloses or encapsulates an active ingredient within the core of the microcapsule.

"High-load," as used herein, refers to an agricultural chemical formulation or composition that contains a relatively large amount (i.e., a high-load) of an active ingredient selected from at least one of a fungicide, an insecticide, a herbicide and a safener.

"Particle agglomeration suppressant" as used herein refers to an inert ingredient that when added to a powder prior to granulation reduces or inhibits the agglomeration or coagulation of the solid particles in the resulting granule during processing of the powder into the granule, thereby improving the dispersion properties of the granule in water.

"Water soluble" nonionic or anionic surfactant, as used herein, refers to a nonionic or anionic surfactant having a solubility in room temperature water of not less than about 2 weight % (wt %), not less than about 3 wt %, not less than about 4 wt %, not less than about 5 wt %, not less than about 6 wt %, not less than about 7 wt %, not less than about 8 wt %, not less than about 9 wt %, not less than about 10 wt %, not less than about 15 wt %, or not less than about 20 wt %.

The term "stable" when used to describe the compositions described herein refers to compositions that are stable physically and/or chemically for defined periods of time to the environments in which they are produced, transported and/or stored. Aspects of stable compositions include, but are not limited to, physical stability at temperatures that range from about 0° C. to about 50° C., compositions that readily wet, disintegrate, disperse and form stable suspensions when poured into water, and retain their biological efficacy when applied, for example, by spray application to target pests, and compositions that contain active ingredients that do not chemically degrade in significant amounts.

The term "herbicide" is used herein to mean an active ingredient that kills, controls, or otherwise adversely modifies the growth of plants. A herbicidally effective or vegetation controlling amount is an amount of active ingredient which causes an adversely modifying effect and includes deviations from natural development, killing, regulation, desiccation, retardation, and the like. The terms plants and vegetation include germinant seeds, emerging seedlings, and established vegetation.

II. Compositions

A. High-Load Herbicide Granules

The high-load, herbicide granules contain crystalline particles of fluroxypyr-meptyl coated with a mixture of a nonionic surfactant and an anionic surfactant, a particle agglomeration suppressant and other inert ingredients. The herbicide granules, such as water dispersible granules, are prepared by processing a herbicide powder, such as a coated herbicide powder or a dry-milled herbicide powder, into the granules. The coated herbicide powder may be a spray dried powder.

1. Coated Herbicide Powder

The coated herbicide powder contains crystalline particles of fluroxypyr-meptyl coated with a mixture of a water soluble nonionic surfactant and a water soluble anionic surfactant, and optionally, additional inert ingredients. The coated herbicide powder may be a spray dried powder or another type of coated herbicide powder.

Provided herein is a coated herbicide powder which contains crystalline particles of fluroxypyr-meptyl coated with a mixture of surfactants containing:

a) a water soluble nonionic surfactant; and b) a water soluble anionic surfactant.

In some embodiments, the coated herbicide powder may be prepared by spray drying an oil-in-water microemulsion containing molten fluroxypyr-meptyl, a water soluble nonionic surfactant and a water soluble anionic surfactant. In some embodiments the water soluble nonionic surfactant is a polyvinyl alcohol with a degree of hydrolysis from about 87% to about 99%. In some embodiments the water soluble anionic surfactant is a lignosulfonate salt selected from a sodium lignosulfonate and/or a calcium lignosulfonate.

2. Dry-Milled Herbicide Powder

The dry-milled herbicide powder contains crystalline particles of fluroxypyr-meptyl, a water soluble nonionic surfactant, a water soluble anionic surfactant, a particle agglomeration suppressant and optionally, additional inert ingredients. The dry-milled herbicide powder may be prepared by mixing together the dry ingredients and dry-milling the mixture until a desired particle size range is obtained.

Provided herein is a dry-milled herbicide powder which contains:

a) crystalline particles of fluroxypyr-meptyl;

b) optionally, a water soluble nonionic surfactant;

c) a water soluble anionic surfactant;

d) a particle agglomeration suppressant; and e) optional inert ingredients.

In some embodiments the dry-milled herbicide powder may be prepared by an air milling process using a hammer mill.

In some embodiments the dry-milled herbicide powder may include one or more optional inert ingredients selected from the group including, but not limited to, biocides, fillers, flow aids, wetting agents, and dispersing agents.

In some embodiments the water soluble nonionic surfactant may be added to the other ingredients as a solid ingredient and the combined ingredients can then be dry-milled together to provide the dry-milled herbicide powder. In some embodiments the water soluble nonionic surfactant may be added as a solution in water to a dry-milled mixture of the other ingredients to form a wetted powder that can then be granulated into the high-load, herbicide granule.

3. Water Dispersible Granule

The powders described herein can be further processed into a granule, such as a water dispersible granule. The water dispersible granule contains crystalline particles of fluroxypyr-meptyl coated with a mixture of a water soluble nonionic surfactant and a water soluble anionic surfactant, a particle agglomeration suppressant and, optionally, additional inert ingredients. The water dispersible granule can be produced by granulation techniques known in the art, such as an extrusion process. The granule is stable during storage at elevated temperatures, and quickly wets, disintegrates, and disperses to form a stable particle suspension in water. Additionally, the dispersible granule composition, when added to water and applied by spray application, maintains good herbicidal efficacy and crop safety when used, for example, to control weeds in cereal crops.

Provided herein is a high-load, herbicide granule which contains crystalline particles of fluroxypyr-meptyl coated with a mixture of surfactants containing:

a) a water soluble nonionic surfactant; and b) a water soluble anionic surfactant;

and a particle agglomeration suppressant.

In certain embodiments, the herbicide granule may include additional active ingredients and/or inert formulation ingredients.

In some embodiments, the herbicide granule is a water dispersible granule.

In some embodiments, the water soluble nonionic surfactant is a polyvinyl alcohol with a degree of hydrolysis from about 87% to about 99%.

In some embodiments, the water soluble anionic surfactant is a lignosulfonate salt selected from a sodium lignosulfonate and/or a calcium lignosulfonate.

In some embodiments, the particle agglomeration suppressant is an ionic compound selected from an inorganic salt of an inorganic acid, an inorganic salt of an organic acid, and a nitrogen-containing compound such as a nitrogen fertilizer.

B. Fluroxypyr-Meptyl

Fluroxypyr-meptyl, the 2-methylheptyl ester of 4-amino-3,5-dichloro-6-fluoro-2-pyridyloxyacetic acid, is a member of the synthetic auxin class of herbicides. Fluroxypyr-meptyl has a melting point of about 58-60° C. and has very low solubility in water (<1 ppm).

Exemplary uses of fluroxypyr-meptyl include post-emergent, foliar spray application to control a range of economically important broad-leaved weeds in small grain crops, pastures, and amenity grassland. Directed applications may also be used against herbaceous and woody broad-leaved weeds in orchards and plantation crops.

The coated herbicide powder and the water dispersible granule compositions described herein include coated, solid particles of fluroxypyr-meptyl that are largely or nearly completely in crystalline form. The degree of crystallinity of the solid particles of fluroxypyr-meptyl in these compositions (i.e., the weight percent of the fluroxypyr-meptyl that is in crystalline form) can be determined by differential scanning calorimetry (DSC) analysis and comparing the thermal properties of these compositions to a crystalline, non-coated sample of fluroxypyr-meptyl. In some embodiments, the coated particles of fluroxypyr-meptyl in these compositions have a degree of crystallinity that is at least about 70%, at least about 80%, at least about 90%, at least about 91%, at least about 92%, at least about 93%, at least about 94%, at least about 95%, at least about 96%, at least about 97%, at least about 98%, or at least about 99% and is reached within about one day, within about 2 days, within about 3 days, within about 4 days, within about 5 days, within about 6 days, or within about 7 days from the time of preparation of these solid compositions.

The coated herbicide powder and water dispersible granule compositions described herein contain coated, crystalline particles of fluroxypyr-meptyl that have a particle size (i.e., a diameter) that may range from about 1 to about 50 microns (μm) such as, from about 1 to about 40 μm, from about 1 to about 30 μm, from about 1 to about 25 μm, from about 1 to about 20 μm, from about 1 to about 15 μm, or from about 1 to about 10 μm.

The coated herbicide powder includes, with respect to the described composition, from about 350 grams of active ingredient per kilogram (gai/kg) to about 800 gai/kg of fluroxypyr-meptyl, such as from about 350 gai/kg to about 750 gai/kg, from about 400 gai/kg to about 750 gai/kg, from about 450 gai/kg to about 750 gai/kg, from about 500 gai/kg to about 750 gai/kg, from about 500 gai/kg to about 700 gai/kg, from about 550 gai/kg to about 750 gai/kg, from about 600 gai/kg to about 750 gai/kg, from about 600 gai/kg to about 700 gai/kg, or from about 650 gai/kg to about 700 gai/kg of fluroxypyr-meptyl.

The water dispersible granule includes, with respect to the described composition, from about 350 grams of active ingredient per kilogram (gai/kg) to about 700 gai/kg of fluroxypyr-meptyl, such as from about 350 gai/kg to about 650 gai/kg, from about 350 gai/kg to about 600 gai/kg, from about 400 gai/kg to about 600 gai/kg, from about 400 gai/kg to about 575 gai/kg, from about 400 gai/kg to about 550 gai/kg, from about 400 gai/kg to about 540 gai/kg, from about 400 gai/kg to about 530 gai/kg, from about 400 gai/kg to about 520 gai/kg, from about 420 gai/kg to about 520 gai/kg, from about 430 gai/kg to about 520 gai/kg, from about 440 gai/kg to about 520 gai/kg, from about 450 gai/kg to about 520 gai/kg, from about 470 gai/kg to about 520 gai/kg, or from about 480 gai/kg to about 520 gai/kg of fluroxypyr-meptyl.

The dry-milled herbicide powder includes, with respect to the described composition, from about 350 grams of active ingredient per kilogram (gai/kg) to about 700 gai/kg of fluroxypyr-meptyl, such as from about 350 gai/kg to about 650 gai/kg, from about 350 gai/kg to about 600 gai/kg, from about 400 gai/kg to about 600 gai/kg, from about 400 gai/kg to about 575 gai/kg, from about 400 gai/kg to about 550 gai/kg, from about 400 gai/kg to about 540 gai/kg, from about 400 gai/kg to about 530 gai/kg, from about 400 gai/kg to about 520 gai/kg, from about 420 gai/kg to about 520 gai/kg, from about 430 gai/kg to about 520 gai/kg, from about 440 gai/kg to about 520 gai/kg, from about 450 gai/kg to about 520 gai/kg, from about 470 gai/kg to about 520 gai/kg, or from about 480 gai/kg to about 520 gai/kg of fluroxypyr-meptyl.

C. Non-Ionic Surfactant

The water soluble, nonionic surfactant used in the coated herbicide powder, the dry-milled herbicide powder and the water dispersible granule includes, but is not limited to, nonionic surfactants that are polyvinyl alcohols or co-polymers of polyvinyl alcohol. The polyvinyl alcohols are made from the hydrolysis of polyvinyl acetate. These polyvinyl alcohols vary in the degree of hydrolysis (i.e., the relative amount of acetate groups removed by hydrolysis) from about 87 to about 99%. In some embodiments, the degree of hydrolysis of the polyvinyl alcohols used in the described compositions may range from about 87 to about 89%. Examples of polyvinyl alcohols suitable for use with the solid herbicide compositions include, but are not limited to, Selvol® 203, 203S, 205, 205S, 502, and 504 which are available from Sekisui Chemical Co., Ltd. (Secaucus, N.J.), and Gohsenol® GL03 and GL05 which are available from Nippon Gohsei (La Porte, Tex.).

The coated herbicide powder, the dry-milled herbicide powder and the water dispersible granule may include, with respect to the composition, from about 1 g/kg to about 100 g/kg, from about 5 g/kg to about 90 g/kg, from about 10 g/kg to about 80 g/kg, from about 15 g/kg to about 70 g/kg, from about 20 g/kg to about 60 g/kg, from about 20 g/kg to about 50 g/kg, from about 10 g/kg to about 50 g/kg, from about 20 g/kg to about 40 g/kg, from about 25 g/kg to about 40 g/kg, from about 30 g/kg to about 40 g/kg, from about 35 g/kg to about 40 g/kg, from about 25 g/kg to about 35 g/kg, from about 25 g/kg to about 33 g/kg, or from about 25 g/kg to about 30 g/kg of the water soluble, nonionic surfactant.

D. Anionic Surfactant

The water soluble anionic surfactant used in the coated herbicide powder, the dry-milled herbicide powder and the water dispersible granule includes anionic surfactants such as lignosulfonate salts. Examples of lignosulfonate salts suitable for use with the coated herbicide powder, the dry-milled herbicide powder and the water dispersible granule include sodium lignosulfonates and/or calcium lignosulfonates found in products such as, but not limited to, Borresperse® NA, CA and 3A, which are available from Borregaard LignoTech (Houston, Tex.), and Polyfon® H, O, T, and F, Kraftsperse® 25M and Reax® 88B and 825, which are all available from MeadWestvaco (Richmond, Va.).

The coated herbicide powder, the dry-milled herbicide powder and the water dispersible granule may include, with respect to the composition, from about 10 g/kg to about 600 g/kg, such as from about 25 g/kg to about 600 g/kg, from about 50 g/kg to about 600 g/kg, from about 75 g/kg to about 600 g/kg, from about 100 g/kg to about 600 g/kg, from about 150 g/kg to about 600 g/kg, from about 200 g/kg to about 550 g/kg, from about 200 g/kg to about 500 g/kg, from about 100 g/kg to about 500 g/kg, from about 50 g/kg to about 500 g/kg, from about 200 g/kg to about 450 g/kg, from about 200 g/kg to about 400 g/kg, from about 100 g/kg to about 400 g/kg, from about 220 g/kg to about 380 g/kg, from about 240 g/kg to about 360 g/kg, from about 260 g/kg to about 340 g/kg, or from about 260 g/kg to about 320 g/kg, of the water soluble anionic surfactant.

E. Particle Agglomeration Suppressant

The particle agglomeration suppressant used in the dry-milled herbicide powder and the water dispersible granule is an inert ingredient that when added to a powder containing apesticide prior to granulation, reduces or inhibits the agglomeration or coagulation of the solid particles of the resulting granule during processing of the powder into the granule, thereby improving the dispersion properties of the granule when added to water. The particle agglomeration suppressant may also serve to inhibit the agglomeration or coagulation of the solid particles of the granule during storage.

The particle agglomeration suppressant generally has a water solubility of greater than about 20 weight %; w/w basis. In some embodiments, the water solubility of the particle agglomeration suppressant is at least 30, 40, 50 or 60 weight % on a weight/weight basis. Examples of particle agglomeration suppressants include, but are not limited to, ionic compounds such as, for example, inorganic salts of inorganic and organic acids, and nitrogen-containing compounds such as, for example, nitrogen fertilizers. Suitable ionic compounds include alkali metal, magnesium, calcium and ammonium salts of inorganic and organic acids such as hydrochloric acid, sulphuric acid, nitric acid, phosphoric acid, carbonic acid, acetic acid and the like. Suitable nitrogen fertilizers may include urea, ammonium sulfate, ammonium nitrate, potassium chloride, and the like.

In some embodiments, the particle agglomeration suppressant is a salt of an inorganic or organic acid. In some embodiments, the particle agglomeration suppressant is a salt of an inorganic acid. In some embodiments, the particle agglomeration suppressant is an alkali metal, alkali earth metal, or ammonium salt. In some embodiments, the particle agglomeration suppressant is a sulfate, nitrate, or citrate salt. In certain embodiments, the particle agglomeration suppressant is magnesium sulfate or ammonium nitrate. In certain embodiments, the particle agglomeration suppressant is ammonium sulfate. In some embodiments, the particle agglomeration suppressant is a salt of an inorganic acid or organic acid, including alkali metal, magnesium, calcium and ammonium salts of inorganic and organic acids such as hydrochloric acid, sulphuric acid, nitric acid, phosphoric acid, carbonic acid, acetic acid and the like such as, for example, sodium chloride, potassium chloride, magnesium chloride, calcium chloride, ammonium chloride, sodium sulfate, potassium sulfate, magnesium sulfate, sodium nitrate, potassium nitrate, monosodium phosphate, mono-, di- and tripotassium phosphate, sodium carbonate, sodium bicarbonate, potassium carbonate, potassium bicarbonate, sodium acetate, potassium acetate and ammonium acetate; fertilizers such as, for example, ammonium sulfate, mono-, di- and triammonium phosphate, ammonium nitrate and urea; and mixtures of any of the particle agglomeration suppressants described herein.

The dry-milled herbicide powder and the water dispersible granule may include, with respect to the composition, from about 20 g/kg to about 300 g/kg, from about 20 g/kg to about 250 g/kg, from about 20 g/kg to about 225 g/kg, from about 20 g/kg to about 200 g/kg, from about 20 g/kg to about 175 g/kg, from about 20 g/kg to about 150 g/kg, from about 50 g/kg to about 150 g/kg, from about 20 g/kg to about 125 g/kg, from about 20 g/kg to about 100 g/kg, from about 30 g/kg to about 100 g/kg, from about 40 g/kg to about 100 g/kg, from about 50 g/kg to about 100 g/kg, from about 60 g/kg to about 100 g/kg, or from about 70 g/kg to about 100 g/kg of the agglomeration suppressant.

F. Additional Inert Ingredients

The high-load herbicide granule that is the water dispersible granule may include additional inert ingredients that can be added at any stage in the preparation of the herbicide granule from the coated herbicide powder or the dry-milled herbicide powder. These inert ingredients can aid in the processing to prepare the coated herbicide powder, the dry-milled herbicide powder and the herbicide granule, improve the final quality and stability of the herbicide granule, and/or aid in the performance of the herbicide granule. These additional inert ingredients may include, but are not limited to, flowability additives and anti-caking agents such as, for example, hydrophilic precipitated silicas, hydrophilic fumed silicas and clays, anti-foaming agents, wetting agents, binders, biocides, dispersing agents, solid diluents, fillers and carriers.

G. Stability of the Described Compositions

In some embodiments, the water dispersible granules described herein are stable at temperatures of greater than or equal to about 40° C. for a period of at least 2, 4, 6 or 8 weeks. In some embodiments, the solid herbicide compositions described herein are stable at temperatures greater than or equal to about 54° C. for a period of at least about 2 or 4 weeks.

In some embodiments, the water dispersible granules described herein remain stable after storage in sealed containers for at least about 2, 4, 6, or 8 weeks at temperatures of at least about 30° C., at least about 40° C., at least about 50° C., or at least about 54° C.

In some embodiments, the water dispersible granules described herein after storage at the temperatures and conditions described herein, readily wet, disintegrate, disperse and form stable suspensions in water that is equal to or less than a temperature of about 5° C., equal to or less than about 10° C., equal to or less than about 15° C., equal to or less than about 20° C., or equal to or less than about 25° C.

The physical stability of the water dispersible granules described herein after storage at the temperatures and conditions described herein can be determined by: (1) measuring the time it takes for the granules to fully disperse when added to water (i.e., the dispersion time) to form a suspension, (2) measuring the stability of the resulting suspension (i.e., measurement of the total suspensibility of the sample), (3) conducting a wet sieve test on the suspension, and (4) measuring the particle size distribution of the suspension, and comparing these values to those of the corresponding samples that were measured prior to storage.

The chemical stability of the water dispersible granules described herein after storage at the temperatures and conditions described herein can be determined by measuring the concentration of the active ingredient or active ingredients in the composition and comparing them to their initial concentration before storage. Stable compositions exhibit losses or degradation of their active ingredients of less than about 10%, less than about 8%, less than about 6%, less than about 5%, less than about 4%, less than about 3%, less than about 2%, or less than about 1% of the initial concentration of the active ingredients in the composition before storage.

The dispersion time of the water dispersible granules described herein is a measure of how long it takes for the composition to wet, disintegrate, and fully disperse in water and can be readily determined using the method described herein. The stability of the suspension that forms upon dispersion of the water dispersible granules described herein in water can be determined by measuring how much of the sample remains suspended after a period of time (i.e., the total suspensibility) and how much of the sample will be retained on a sieve when the suspension is passed through it (wet sieve test). The total suspensibility of a sample can be determined using CIPAC Method 184.

In some embodiments, the water dispersible granules described herein after storage at temperatures equal to or greater than room temperature, equal to or greater than 30° C., equal to or greater than 40° C., or equal to or greater than 50° C., readily wet, disintegrate, and fully disperse in room temperature water with a hardness of 342 ppm in no more about 2½ minutes, no more than about 3 minutes, no more than about 3½ minutes, no more than about 4 minutes, or no more than about 4½ minutes.

In some embodiments, the water dispersible granules described herein, after storage at temperatures equal to or greater than room temperature, equal to or greater than 30° C., equal to or greater than 40° C., or equal to or greater than 50° C., readily wet, disintegrate, disperse and form stable suspensions in room temperature water with a hardness of 342 ppm, have total suspensibilities of, not less than 80%, not less than 85%, not less than 90%, not less than 92%, not less than 94%, not less than 95%, not less than 96%, not less than 97%, not less than 98%, or not less than 99%.

In some embodiments, the water dispersible granules described herein, after storage at temperatures equal to or greater than room temperature, equal to or greater than 30° C., equal to or greater than 40° C., or equal to or greater than 50° C., readily wet, disintegrate, disperse and form stable suspensions in room temperature water with a hardness of 342 ppm, and when the suspension is poured through a 200 mesh sieve, less than about 1.0 wt %, less than about 0.5 wt %, less than about 0.4 wt %, less than about 0.3 wt %, less than about 0.2 wt %, less than about 0.1 wt %, or less than about 0.05 wt % of the sample is retained on the sieve.

In some embodiments, the water dispersible granules described herein, after storage at temperatures equal to or greater than room temperature, equal to or greater than 30° C., equal to or greater than 40° C., or equal to or greater than 50° C., readily wet, disintegrate, disperse and form stable suspensions in room temperature water with a hardness of 342 ppm that have a particle size distribution, as measured by a laser diffraction particle size analyzer and reported as $d_{50}/d_{90}$ values in microns (μm), in which the $d_{50}$ and/or the $d_{90}$ values do not increase by more than about 500%, more than about 400%, more than about 300%, more than about 200%, more than about 100%, or more than about 50% from their original values measured before storage.

III. Method of Preparation

Granule formulations may be produced using one or more techniques known in the art, such as: (1) pan granulation, (2) mixing agglomeration, (3) extrusion granulation, (4) fluid bed granulation, (5) spray granulation or agglomeration and (6) drum granulation. Also, preparation of granules using a pellet press may be used. The physico-chemical properties of the active ingredient and additives are important to consider when choosing a process to use. G. A. Bell and D. A. Knowles in, "Chemistry and Technology of Agrochemical Formulations," D. A. Knowles, editor, (Kluwer Academic Publishers, 1998), pages 41-114, describe the types of granules used in agricultural chemical formulations and provide many references to the production of these solid formulations. Powder compositions can be produced by vacuum drying, rotary evaporator drying, spray drying, drum drying or other processing methods that are well known to those of normal skill in the art. In any of the processing methods described herein, inert ingredients may be added to the composition before, during or after processing to improve the processing or to improve the final quality, stability or performance of the granule or powder.

In some embodiments, the high-load herbicide granule may be prepared by mixing the coated herbicide powder with inert ingredients including, but not limited to, the particle agglomeration suppressant, and one or more flow aids and fillers, and the resulting dry mixture is combined with water and granulated to provide, after drying, the high-load, herbicide granule that is a water dispersible granule.

In some embodiments, the high-load, herbicide granule can be prepared by granulating the dry-milled herbicide powder that is prepared by mixing together fluroxypyr-meptyl with the inert formulation ingredients and dry-milling them to an acceptable particle size range. In some embodiments the dry-milling is conducted using a hammer mill.

The granulation of the coated herbicide powder or the dry-milled herbicide powder can be conducted using an extrusion process, such as a high shear extrusion process or a low shear extrusion process. In some embodiments the granulation of the coated herbicide powder or the dry-milled herbicide powder can be conducted by using a low shear extrusion process. In some embodiments the low shear extrusion process is a basket extrusion process or a twin dome extrusion process.

In a typical procedure for preparing the coated herbicide powder described herein, a water phase is prepared by mixing together the water soluble ingredients including, but not limited to, water soluble surfactants, and, optionally, other inert ingredients in water. An oil phase is prepared by mixing together any oil soluble ingredients including, but not limited to, the fluroxypyr-meptyl active ingredient. The oil and water phases are heated to insure the formation of homogeneous liquid phases and then the heated oil phase is slowly added into the heated aqueous phase under high shear homogenization until the desired microemulsion is achieved. The microemulsion is then dried to provide the coated herbicide powder.

In some embodiments, in the process to make the coated herbicide powder, the oil and water phases may be mixed together to form the microemulsion by using an in-line, continuous process or a batch process. In some embodiments, the microemulsion can be dried using a spray drying process to produce the coated herbicide powder that is a spray dried powder. Inert ingredients may be added before, during or after the drying process step to improve the flow properties of the coated herbicide powder that is a spray dried powder or is dried by another method.

The dry-milled herbicide powder, includes crystalline particles of fluroxypyr-meptyl, a water soluble nonionic surfactant, a water soluble anionic surfactant, a particle agglomeration suppressant and optionally, additional inert ingredients. The dry-milled herbicide powder may be prepared by mixing together the dry ingredients and dry-milling the mixture until a desired particle size range is obtained. In some embodiments, the water soluble nonionic surfactant may be added to the dry-milled herbicide powder as a solution in water after the other dry ingredients have been combined and dry-milled together.

The order of addition of the inert ingredients can be changed to improve the process or the quality, handling properties or performance of the powder or granule as needed. The most optimal way of practicing the method described herein to prepare the high-load, herbicide granule composition can be easily determined by one of ordinary skill in the art.

IV. Method of Use

Described herein are methods of controlling undesirable plant growth by using the described high-load solid herbicide compositions. In this aspect, a herbicidally effective amount of the solid herbicide compositions, either the powder or the dispersible granule, are added to spray water and the resulting spray solution or mixture is used for spray application to control the undesirable plant growth. Also described is a method of controlling undesirable vegetation by applying to the vegetation or an area adjacent the vegetation or applying to the soil to prevent the emergence of the vegetation, a herbicidally effective amount of the solid herbicide compositions that are dispersed in a spray solution of water.

A. Controlling Plant Growth

Herbicidal activity is exhibited by the compositions described herein when the compositions are added to water and applied directly to the plant or to the locus of the plant at any stage of growth or before planting or emergence. The effect observed depends upon the plant species to be controlled, the stage of growth of the plant, the application parameters of dilution and spray drop size, the particle size of solid components, the environmental conditions at the time of use, the specific compound employed, the specific adjuvants and carriers employed, the soil type, and the like, as well as the amount of chemical applied. These and other factors can be adjusted as is known in the art to promote non-selective or selective herbicidal action.

Application rates of about 1 to about 2,000 grams per hectare (g/Ha) are generally employed in both postemergence and preemergence applications. The higher rates designated generally give non-selective control of a broad variety of undesirable vegetation. The lower rates typically give selective control and can be employed in the locus of crops.

B. Other Pesticides, Plant Growth Regulators and Safeners

An additional embodiment concerns using one or more pesticide active ingredients, plant growth regulators or safeners with the compositions and methods described herein. The pesticide active ingredients may include one or more of an herbicide, an insecticide, and a fungicide. The solid herbicide compositions described herein can be applied in conjunction with one or more other pesticide active ingredients, plant growth regulators or safeners. When used in conjunction with the other pesticide active ingredients, plant growth regulators or safeners, the solid herbicide compositions can be formulated with the other pesticide active ingredients, plant growth regulators or safeners, tank-mixed with the other pesticide active ingredients, plant growth regulators or safeners, or applied sequentially with the other pesticide active ingredients, plant growth regulators or safeners.

1. Herbicides

Suitable herbicides that may be used with the compositions and methods described herein include, but are not limited to, one or more of 4-CPA, 4-CPB, 4-CPP, 2,4-D, 3,4-DA, 2,4-DB, 3,4-DB, 2,4-DEB, 2,4-DEP, 3,4-DP, 2,4,5-T, 2,4,5-TB, 2,3,6-TBA, allidochlor, acetochlor, acifluorfen, aclonifen, alachlor, alloxydim, alorac, ametridione, ametryn, amibuzin, amicarbazone, amidosulfuron, aminocyclopyrachlor, aminopyralid, aminopyralid, amiprofos-methyl, amitrole, anilofos, anisuron, asulam, asulam, atraton, atrazine, azafenidin, azimsulfuron, aziprotryne, barban, BCPC, beflubutamid, benazolin, bencarbazone, benfluralin, benfuresate, bensulfuron, bensulide, bentazone, benzadox, benzfendizone, benzipram, benzobicyclon, benzofenap, benzofluor, benzoylprop, benzthiazuron, bicylopyrone, bifenox, bilanafos, bilanafos, bispyribac, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cafenstrole, cafenstrole, cambendichlor, carbasulam, carbasulam, carbetamide, carboxazole chlorprocarb, carfentrazone, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop, clofop, clomazone, clomeprop, clomeprop, cloprop, cloproxydim, clopyralid, clopyralid, cloransulam, CPMF, CPPC, credazine, cumyluron, cyanatryn, cyanazine, cycloate, cyclosulfamuron, cycloxydim, cycluron, cyhalofop, cyperquat, cyprazine, cyprazole, cypromid, daimuron, dalapon, dazomet, delachlor, desmedipham, desmetryn, di-allate, dicamba, dichlobenil, dichloralurea, dichlormate, dichlorprop, dichlorprop-P, diclofop, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinitramine, dinofenate, dinoprop, dinosam, dinoseb, dinoterb, diphenamid, dipropetryn, diquat, disul, dithiopyr, diuron, DMPA, DNOC, EBEP, eglinazine, endothal, epronaz, epronaz, EPTC, erbon, esprocarb, ethalfluralin, ethametsulfuron, ethidimuron, ethiolate, ethofumesate, ethoxyfen, ethoxysulfuron, etinofen, etnipromid, etnipromid, etnipromid, etobenzanid, EXD, fenasulam, fenasulam, fenasulam, fenoprop, fenoxaprop, fenoxaprop-P, fenoxasulfone, fenteracol, fenthiaprop, fentrazamide, fenuron, flamprop, flamprop-M, flazasulfuron, florasulam, fluazifop, fluazifop-P, fluazolate, flucarbazone, flucetosulfuron, fluchloralin, flufenacet, flufenican, flufenpyr, flumetsulam, flumezin, flumiclorac, flumioxazin, flumipropyn, fluometuron, fluorodifen, fluoroglycofen, fluoromidine, fluoronitrofen, fluothiuron, flupoxam, flupoxam, flupropacil, flupropanate, flupyrsulfuron, fluridone, flurochloridone, flurtamone, fluthiacet, fomesafen, fomesafen, foramsulfuron, fosamine, furyloxyfen, glufosinate, glyphosate, halauxifen, halosafen, halosafen, halosulfuron, haloxydine, haloxyfop, haloxyfop-P, hexazinone, imazamethabenz, imazamox, imazapic, imazapyr, imazaquin, imazethapyr, imazosulfuron, indanofan, indaziflam, iodobonil, iodosulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MCPA, MCPA-thioethyl, MCPB, mecoprop, mecoprop-P, medinoterb, mefenacet, mefluidide, mesoprazine, mesosulfuron, mesotrione, metam, metamifop, metamifop, metamitron, metazachlor, metazosulfuron, metflurazon, methabenzthiazuron, methalpropalin, methazole, methiobencarb, methiozolin, methiuron, methiuron, methometon, methoprotryne, methyldymron, metobenzuron, metobromuron, metolachlor, S-metolachlor, metosulam, metoxuron, metribuzin, metsulfuron, molinate, monalide, monisouron, monochloroacetic acid, monolinuron, monuron, morfamquat, naproanilide, napropamide, naptalam, neburon, nicosulfuron, nipyraclofen, nitralin, nitrofen, nitrofluorfen, norflurazon, noruron, OCH, orbencarb, orthosulfamuron, oryzalin, oryzalin, oxadiargyl, oxadiazon, oxapyrazon, oxasulfuron, oxaziclomefone, oxyfluorfen, parafluron, paraquat, pebulate, pelargonic acid, pendimethalin, penoxsulam, pentanochlor, pentoxazone, perfluidone, pethoxamid, phenisopham, phenmedipham, phenmedipham-ethyl, phenobenzuron, picloram, picloram, picolinafen, picolinafen, pinoxaden, piperophos, pretilachlor, primisulfuron, procyazine, prodiamine, prodiamine, profluazol, profluralin, profoxydim, proglinazine, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazolynate, pyrazosulfuron, pyrazoxyfen, pyribenzoxim, pyributicarb, pyriclor, pyridafol, pyridate, pyriftalid, pyriminobac, pyrimisulfan, pyrithiobac, pyroxasulfone, pyroxsulam, quinclorac, quinmerac, quinoclamine, quinonamid, quizalofop, quizalofop-P, rhodethanil, rimsulfuron, sebuthylazine, secbumeton, sethoxydim, siduron, simazine, simeton, simetryn, sulcotrione, sulfallate, sulfentrazone, sulfometuron, sulfosulfuron, sulglycapin, swep, tebutam, tebuthiuron, tefuryltrione, tembotrione, tepraloxydim, terbacil, terbucarb, terbuchlor, terbumeton, terbuthylazine, terbutryn, tetrafluron, thenylchlor, thiazafluron, thiazopyr and triclopyr, thidiazimin, thidiazuron, thidiazuron, thiencarbazone-methyl, thifensulfuron, thiobencarb, tiocarbazil, tioclorim, topramezone, tralkoxydim, tri-allate, triasulfuron, triaziflam, tribenuron, tricamba, tridiphane, trietazine, trifloxysulfuron, trifluralin, triflusulfuron, trifop, trifopsime, trihydroxytriazine, trimeturon, tripropindan, tritac, tritosulfuron, vernolate, xylachlor, or ester and salt derivatives thereof, and compounds of the following Formula

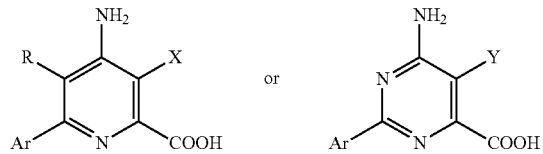

wherein Ar represents a phenyl group substituted with one to four substituents independently selected from halogen, $C_1$-$C_6$ alkyl, $C_1$-$C_6$ alkoxy, $C_2$-$C_4$ alkoxyalkyl, $C_2$-$C_6$ alkylcarbonyl, $C_1$-$C_6$ alkylthio, $C_1$-$C_6$ haloalkyl, $C_1$-$C_6$ haloalkoxy, $C_2$-$C_4$ haloalkoxyalkyl, $C_2$-$C_6$ haloalkylcarbonyl, $C_1$-$C_6$ haloalkylthio, —OCH$_2$CH$_2$—, —OCH$_2$CH$_2$CH$_2$—, —OCH$_2$O— or —OCH$_2$CH$_2$O—; R represents H or F; X represents Cl or vinyl; and Y represents Cl, vinyl or methoxy; and their salts and esters as disclosed, for example, in U.S. Pat. No. 7,314,849 B2, U.S. Pat. No. 7,300,907 B2, U.S. Pat. No. 7,786,044 B2 and U.S. Pat. No. 7,642,220 B2.

Especially suitable herbicides useful with the compositions and methods described herein include 2,4-D, 2,4-DB, aminocyclopyrachlor, aminopyralid, clopyralid, dicamba, halauxifen, MCPA, MCPB, picloram, triclopyr, acetochlor, atrazine, benfluralin, cloransulam, cyhalofop, diclosulam, dithiopyr, ethalfluralin, florasulam, flumetsulam, glufosinate, glyphosate, haloxyfop, isoxaben, MSMA, oryzalin, oxyfluorfen, pendimethalin, penoxsulam, propanil, pyroxsulam, quizalofop, tebuthiuron, trifluralin, or ester and salt derivatives thereof, and the compound of the Formula

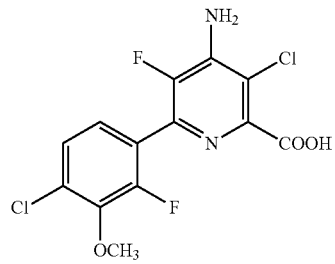 [SMILES: COc1c(Cl)ccc(-c2nc(C(=O)O)c(Cl)c(N)c2F)c1F]

and its $C_1$-$C_{12}$ alkyl or $C_7$-$C_{12}$ arylalkyl ester or salt derivatives such as, for example, the benzyl ester.

2. Insecticides

Suitable insecticides that may be used with the compositions and methods described herein include, but are not limited to, one or more of abamectin, acephate, acetamiprid, acrinathrin, alpha-cypermethrin, alpha-endosulfan, azadirachtin, azinphos-ethyl, azinphos-methyl, bendiocarb, benfuracarb, bensultap, beta-cyfluthrin, beta-cypermethrin, bifenthrin, bufencarb, buprofezin, butacarb, cadusafos, carbaryl, carbofuran, carbosulfan, cartap, cartap hydrochloride, chlorantraniliprole, chlorfenapyr, chlorfenvinphos, chlorfluazuron, chlormephos, chlorpyrifos, chlorpyrifos-methyl, chromafenozide, clothianidin, cyantraniliprole, cyfluthrin, cyhalothrin, cypermethrin, deltamethrin, diazinon, dicrotophos, diflubenzuron, dimethoate dinotefuran, disulfoton, emamectin, emamectin benzoate, endosulfan, endothion, endrin, EPN, esfenvalerate, etaphos, ethiofencarb, ethion, ethiprole, ethoate-methyl, etofenprox, fenamiphos, fenazaflor, fenethacarb, fenitrothion, fenobucarb, fenpropathrin, fensulfothion, fenthion, fenthion-ethyl, fenvalerate, fipronil, flonicamid, flubendiamide, flucythrinate, fonofos, fufenozide, furathiocarb, gamma-cyhalothrin, gamma-HCH, halfenprox, halofenozide, heptenophos, hyquincarb, imidacloprid, indoxacarb, isazofos, isobenzan, isocarbophos, isofenphos, isofenphos-methyl, isoprocarb, isothioate, isoxathion, kinoprene, lambda-cyhalothrin, lepimectin, lufenuron, malathion, methamidophos, methomyl, methoxyfenozide, mevinphos, mexacarbate, milbemectin, monocrotophos, nitenpyram, novaluron, omethoate, oxamyl, oxydemeton-methyl, oxydeprofos, oxydisulfoton, parathion, parathion-methyl, penfluron, permethrin, phenthoate, phorate, phosalone, phosfolan, phosmet, phosphamidon, pirimetaphos, pirimicarb, pirimiphos-ethyl, pirimiphos-methyl, primidophos, profenofos, profluthrin, promecarb, propaphos, propoxur, prothiofos, pymetrozine, pyrafluprole, pyridalyl, pyrifluquinazon, pyriprole, pyriproxyfen, spinetoram, spinosad, spirotetramat, sulfoxaflor, sulprofos, tau-fluvalinate, tebufenozide, tebufenpyrad, teflubenzuron, tefluthrin, tetramethylfluthrin, theta-cypermethrin, thiacloprid, thiamethoxam, thicrofos, thiocyclam, thiocyclam oxalate, thiodicarb, thiometon, thiosultap, thiosultap-disodium, thiosultap-monosodium, thuringiensin, tolfenpyrad, triazophos, triflumuron and zeta-cypermethrin.

3. Fungicides

Suitable fungicides that may be used with the compositions and methods described herein include, but are not limited to, one or more of azoxystrobin, bifujunzhi, coumethoxystrobin, coumoxystrobin, dimoxystrobin, enestroburin, enoxastrobin, fenaminstrobin, fenoxystrobin, flufenoxystrobin, fluoxastrobin, jiaxiangjunzhi, kresoxim-methyl, mandestrobin, metominostrobin, orysastrobin, picoxystrobin, pyraclostrobin, pyrametostrobin, pyraoxystrobin, triclopyricarb, trifloxystrobin, methyl 2-[2-(2,5- dimethylphenyloxymethyl)-phenyl]-3-methoxyacrylate, pyribencarb, triclopyricarb/chlorodincarb, famoxadon, fenamidon, cyazofamid, amisulbrom, benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane, tecloftalam, thifluzamide, N-(4'-trifluoromethylthio-biphenyl-2-yl)-3-difluoromethyl-1-methyl-1H-pyrazole-4-carboxamide, N-(2-(1,3,3-trimethylbutyl)phenyl)-1,3-dimethyl-5-fluoro-1H-pyrazole-4-carboxamide, N-[9-(dichloromethylene)-1,2,3,4-tetrahydro-1,4-methanonaphthalen-5-yl]-3-(difluoromethyl)-1-methyl-1H-pyrazole-4-carboxamide, diflumetorim, binapacryl, dinobuton, dinocap, meptyl-dinocap, fluazinam, ferimzone, ametoctradin, silthiofam, azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, probenazole, propiconazole, prothioconazole, simeconazole, tebuconazole, tetraconazole, triadimefon, triadimenol, triticonazole, uniconazole, imazalil, pefurazoate, prochloraz, triflumizole, pyrimidines, fenarimol, isotianil, nuarimol, pyrifenox, triforine, aldimorph, dodemorph, dodemorph acetate, fenpropimorph, tridemorph, fenpropidin, piperalin, spiroxamine, fenhexamid, benalaxyl, benalaxyl-M, kiralaxyl, metalaxyl, metalaxyl-M (mefenoxam), ofurace, oxadixyl, hymexazole, octhilinone, oxolinic acid, bupirimate, benomyl, carbendazim, fuberidazole, thiabendazole, thiophanate-methyl, tiadinil, 5-chloro-7-(4-methyl-piperidin-1-yl)-6-(2,4,6-trifluorophenyl)-[1,2,4]triazolo[1,5-a]pyrimidine, diethofencarb, ethaboxam, pencycuron, fluopicolid, zoxamid, metrafenon, pyriofenon, cyprodinil, mepanipyrim, pyrimethanil, fluoroimide, iprodione, procymidone, vinclozolin, fenpiclonil, fludioxonil, quinoxyfen, edifenphos, iprobenfos, pyrazophos, isoprothiolane, dicloran, quintozene, tecnazene, tolclofos-methyl, biphenyl, chloroneb, etridiazole, dimethomorph, flumorph, mandipropamid, pyrimorph, benthiavalicarb, iprovalicarb, valifenalate and 4-fluorophenyl N-(1-(1-(4-cyanophenyl)ethanesulfonyl)but-2-yl)carbamate, propamocarb, propamocarb hydrochloride, ferbam, mancozeb, maneb, metiram, propineb, thiram, zineb, ziram, anilazine, chlorothalonil, captafol, captan, folpet, dichlofluanid, dichlorophen, flusulfamide, hexachlorobenzene, pentachlorophenol, phthalide, tolylfluanid, N-(4-chloro-2-nitrophenyl)-N-ethyl-4-methylbenzenesulfonamide, acibenzolar-S-methyl, guanidine, dithianon, kasugamycin, validamycin, polyoxins, polyoxin B, pyroquilon, tricyclazole, toclophos-methyl, carpropamid, dicyclomet, and fenoxanil.

Some of these fungicides may not be effective for disease control when applied at the timing of an herbicide application because fungal disease propagation and growth cycles may not match the targeted weed growth cycles. The effective use and application timing of these fungicides can be easily determined by one of ordinary skill in the art.

4. Plant Growth Regulators

Suitable plant growth regulators that may be used with the compositions and methods described herein include, but are not limited to, one or more of 2,4-D, 2,4-DB, IAA, IBA, naphthaleneacetamide, α-naphthaleneacetic acid, kinetin, zeatin, ethephon, aviglycine, 1-methylcyclopropene (1-MCP), ethephon, gibberellins, gibberellic acid, abscisic acid, ancymidol, flurprimidol, mefluidide, paclobutrazol, tetcyclacis, uniconazole, brassinolide, brassinolide-ethyl and ethylene.

5. Safeners

Suitable safeners that may be used with the compositions and methods described herein include, but are not limited to, one or more of benoxacor, benthiocarb, cloquintocet-mexyl, daimuron, dichlormid, dicyclonon, dimepiperate, fenchlorazole-ethyl, fenclorim, flurazole, fluxofenim, furilazole, isoxadifen-ethyl, mefenpyr-diethyl, mephenate, MG 191, MON 4660, naphthalic anhydride (NA), oxabetrinil, R29148 and N-phenyl-sulfonylbenzoic acid amides.

V. Adjuvants, Carriers and Surface-Active Agents

In addition to the compositions and uses set forth above, the described herbicide compositions may be used in combination with one or more additional compatible ingredients. These additional compatible ingredients may include, but are not limited to, one or more surfactants, fertilizers, pheromones and many other additional ingredients providing functional utility, such as, but not limited to, dyes, stabilizers, compatibilizing agents, antifoam agents, sequestering agents, neutralizing agents and buffers, corrosion inhibitors, odorants, spreading agents, penetration aids, sticking agents, dispersing agents, thickening agents, freezing point depressants, antimicrobial agents, and the like.

The following Examples are presented to illustrate various aspects of the compositions and methods described herein and should not be construed as limitations to the claims.

EXAMPLES

Example 1. Preparation of Described Compositions

Sample 1. Preparation of the High-Load, Herbicide Granule Composition from the Spray-Dried Powder The oil phase composition of molten fluroxypyr-meptyl technical was heated between 70-80° C. and mixed in-line with an aqueous phase (Table 1) also maintained at between 70-80° C. in a flow ratio of aq. phase/oil phase of 1.79 using an in-line homogenizer (IKA Magic LAB) fitted with a three stage (coarse, medium and fine) rotor-stator operating at tip speeds between 22-25 meters per second (m/s) to create an oil-in water emulsion with a particle size distribution: d50 of about 3 microns (μm) and a d90 of about 7 μm. As the tip speed was increased to about 25 m/s, a particle size distribution with a d50 of less than 2 μm was achieved. Alternatively, the oil-in water emulsion was prepared in a batch mode by adding the heated oil-phase into the heated aq. phase in a vessel under agitation and then recirculating it by passing it discretely through the in-line homogenizer. The oil-in water emulsion (EW) was maintained at 70-80° C. and then fed into a spray drier (3 ft diameter Mobile Minor) equipped with a two-fluid nozzle using an air-pressure of about 20 psi in a co-current air flow with an inlet air temperature of 120-135° C. and an outlet air temperature between 75-85° C. to produce a spray dried powder. Typical feed rate was in the range of 40-50 g/min. The composition of the EW is shown in Table 2. To generate a spray dried powder with better flow characteristics, Hi-Sil 233 (a high surface area hydrophilic silica) was added with mixing to provide the composition shown in Table 3. Differential scanning calorimetry (DSC) characterization showed that the powder contained fluroxypyr-meptyl that was >90% crystalline within 48 hours after spray drying.

The spray dried powder containing the Hi-Sil 233 (Table 3) was mixed with a powder of the composition shown in Table 4 that had been air milled to a particle size distribution with a $d_{50}$ of less than about 5 μm and $d_{90}$ of less than about 15 µm. The resulting powder was combined with water and extruded using a low pressure, basket extrusion process and a screen with 1 mm diameter holes. The extruded granules were dried in a fluid bed dryer with an inlet air temperature in the range of 40-60° C. and a product bed temperature in the range of about 40° C. The final composition of the extruded granules is shown in Table 5 with Borresperse NA being the balance ingredient.

TABLE 1

| | wt % |
|---|---|
| Oil phase | |
| fluroxypyr-meptyl technical (97%) | 100 |
| Aq. Phase | |
| Water | 61.65 |
| Borresperse Na Powder | 23.17 |
| 20% PVA solution of Selvol 205 | 15.18 |

TABLE 2

| EW | wt % |
|---|---|
| fluroxypyr-meptyl | 35.83 |
| sodium lignosulfonate | 14.87 |
| PVA (Selvol 205) | 1.95 |
| Proxel GXL | 0.01 |
| water | 47.35 |

TABLE 3

| Spray Dried Powder | wt % |
|---|---|
| fluroxypyr-meptyl | 65.92 |
| sodium lignosulfonate | 28.93 |
| PVA (Selvol 205) | 3.65 |
| Proxel GXL | 0.02 |
| Hi-Sil 233 | 1.48 |

TABLE 4

| Air-milled Powder for Blending | |
|---|---|
| Air-milled Powder | Wt % |
| Geropon T-77 | 8.0 |
| Borrosperse NA | 30.0 |
| Pergopak M | 24.0 |
| ammonium sulfate | 36.0 |
| kaolin clay | 2.0 |

TABLE 5

Composition of the Extruded Granules (Sample 1)

| | Ingredients | Role | Wt % |
|---|---|---|---|
| 1 | fluroxypyr-meptyl | Active Ingredient | 50.43 |
| 2 | Borresperse NA | Dispersant | 29.19 |
| 3 | Geropon T-77 | Wetter | 1.88 |
| 4 | ammonium sulfate | Agglomeration Suppressant | 8.46 |
| 5 | kaolin clay | Filler | 0.47 |
| 6 | Hi-Sil 233 | Flow Aid | 1.13 |
| 7 | Pergopak M | Flow Aid | 5.64 |
| 8 | Proxel GXL | Biocide | 0.01 |
| 9 | polyvinyl alcohol | Emulsifier | 2.79 |

Sample 2. Preparation of the High-Load, Extruded Herbicide Granules from the Dry-Milled Powder Using the ingredients and relative amounts shown in Table 5, ingredients 1-7 were mixed together in a ribbon blender and then dry-milled using a hammer mill to a particle size range of $d_{50}<5$ µm and $d_{90}<15$ µm. After wetting and mixing the dry-milled powder with a 20% aqueous polyvinyl alcohol solution and an additional 15-20 wt % of water, the resulting wetted powder was extruded through a NICA extruder using a 1 mm screen. The wet granules produced were dried in a fluid bed dryer (50° C. inlet temperature) to provide, after screening (mesh size −10/+40), the dried, high-load herbicide granules (Sample 2).

Example 2. Storage Stability of the High-Load Herbicide Granule Compositions

Particle Size, Wet Sieve and Dispersion Time Test Methods

Particle Size Analysis:

After dispersion of a small sample of the extruded granules in room temperature 342 ppm hard water, the particle size distribution of the resulting particle dispersion was determined with a Mastersizer 2000 laser diffraction particle size analyzer and reported as $d_{50}/d_{90}$ values in microns (µm).

Wet Sieve Test:

After dispersion of a weighed sample of the extruded granules in room temperature 342 ppm hard water, the resulting particle dispersion and several water rinses were passed through a 200 mesh sieve. The material retained on the sieve was dried, weighed and reported as the weight percent of the original test sample of the extruded granules.

Dispersion Time Measurement a) weigh 0.1 g sample of granules into a 25 mL beaker;
b) add 100 mL of 342 ppm hard water into a 100 mL stoppered measuring cylinder at room temperature;
c) pour the granules into the measuring cylinder. Start the stop watch. Insert a stopper, immediately invert through 180°, then bring back to original position, the whole operation being completed in approximately 2 seconds.
d) repeat inversion at 10 second intervals thereafter. After each complete inversion, examine the sample for the presence of undispersed or undissolved granules. Continue inverting the sample until all granules are completely dispersed or dissolved.

TABLE 6

Storage Stability Testing of the Extruded Granules

| Test | Storage Time/Temperature | Results Sample 1 | Sample 2 |
|---|---|---|---|
| Particle Size: $d_{50}/d_{90}$ (μm) | 2 wks/RT | 5.39/10.42 | 9.73/21.39 |
| | 2 wks/54° C. | 4.20/8.73 | 9.95/21.77 |
| | 2 wks/FT | 4.34/8.70 | 8.67/18.67 |
| | 8 wks/40° C. | 6.31/12.53 | 5.55/11.20 |
| | 12 wks/40° C. | 3.93/11.30 | 3.89/11.26 |
| Wet Sieve: 200 Mesh (wt % retained on sieve) | 2 wks/RT | 0.19% | 0.02% |
| | 2 wks/54° C. | 0.08% | 0.02% |
| | 2 wks/FT | 0.06% | 0.05% |
| | 8 wks/40° C. | 0.15% | 0.02% |
| | 12 wks/40° C. | 0.25% | 0.08% |
| Dispersion Time for sample added to room temperature (RT) 342 ppm water | 2 wks/RT | 2 min 36 sec | 3 min 4 sec |
| | 2 wks/54° C. | 2 min 41 sec | 3 min 35 sec |
| | 2 wks/FT | 2 min 23 sec | 3 min 5 sec |
| | 8 wks/40° C. | 2 min 43 sec | 2 min 55 sec |
| | 12 wks/40° C. | 2 min 27 sec | 3 min 13 sec |

TABLE 7

Dispersion Testing of the Extruded Granules (Sample 1) in 5° C. (342 ppm) Water

| Extruded Granules (Sample 1) | | |
|---|---|---|
| Dispersion Time (after stored as indicated) | 2 wk/RT | 3 min 25 sec |
| | 2 wk/54° C. | 3 min 26 sec |
| | 2 wk/FT | 3 min 18 sec |
| | 8 wk/40° C. | 3 min 42 sec |
| | 12 wk/40° C. | 3 min 45 sec |
| Casino Herbicide[1] | | |
| Dispersion Time | commercial product | did not disperse fully within 10 minutes |
| Supremacy Herbicide[2] | | |
| Dispersion Time | commercial product | did not disperse fully within 30 minutes (in RT water) |

[1]Casino herbicide (Certis) is a water dispersible granule containing 250 gae/kg of fluroxypyr-MHE;
[2]Supremacy herbicide (Arysta Lifescience) is a water dispersible granule containing 250 gae/kg of fluroxypyr-MHE, 45 gae/kg of thifensulfuron-methyl and 15 gae/kg of tribenuron-methyl.

Example 3. Differential Scanning Calorimetry Analysis of the Spray Dried Powder (Sample 1)

Differential scanning calorimetry (DSC) indicated the fluroxypyr-meptyl contained in the spray dried powder (Table 3) achieved nearly complete crystallinity within about 48 hours after spray drying.

| DSC Thermal Data | Heat Flow (absorbed) |
|---|---|
| 100% crystalline fluroxypyr-meptyl sample | 70.01 J/g |
| Spray dried powder (65.92% fluroxypyr-meptyl) | 43.28 J/g |

Calculation of Degree of Crystallinity (of Fluroxypyr-Meptyl in Spray Dried Powder)

Heat flow into spray dried powder (if 100% crystalline)= (70.01 J/g)×65.92%=46.15 J/g Crystallinity of spray dried powder=[(43.28 J/g)/(46.15 J/g)]×100=93.8%

Example 4. Use of the Described Granule (Sample 1) for Weed Control

Plant material was propagated in the Indianapolis greenhouses under cool temperature conditions of 18° C. and a 16 hour day length and 8 hour dark cycle. Seeds of each species were planted in 10 cm square pots containing Metro-Mix potting soil. Plants were top watered prior to treatment and sub-irrigated after treatment. Appropriate amounts of the fluroxypyr-meptyl granule and the adjuvant AGRAL® 90 (Syngenta) were measured and diluted in Indianapolis tap water.

Fluroxypyr-meptyl treatments were applied to four weed species at the following growth stages: *galium aparine* (GALAP) with 3 to 4 axillary branches, volunteer soybeans (GLXMA) with 1 trifoliate, wild buckwheat (POLC) with 2 to 3 leaves and *kochia* (KCHSC) with 6 to 8 leaves. All treatments were applied to the selected weed species with a track sprayer (Generation III Research Sprayer manufactured by DeVries Manufacturing in Hollandale, Minn., USA) located in building 306, laboratory E1-483, at the Dow AgroSciences facility in Indianapolis, Ind. The track sprayer was calibrated to deliver 187 L/ha at 40 psi (262 kPa) pressure utilizing an 8003E even, flat fan nozzle. Track sprayer speed was set at 2.2 mph (3.5 km h$^{-1}$). Applications were made to replicates of each species in a non-randomized complete block trial design, with 3 replications per treatment.

The treated plants and control plants were rated blind at various intervals after application. Ratings (mean weed control) were based on a scale of 0-100%, wherein 0% indicates no injury or control of the vegetation and 100% indicates complete death of the plants.

Starane® Ultra (Dow AgroSciences; Indianapolis, Ind.) is an emulsifiable concentrate formulation containing 333 gae/L of fluroxypyr-meptyl and is included as a comparison standard.

TABLE 8

Efficacy of fluroxypyr-meptyl treatments on cleavers (GALAP) with tank-mix adjuvant 21 days after application in the greenhouse (mean weed control).

| Rate (g ae/ha) | Starane ® Ultra | Extruded Granule + Agral 90 |
|---|---|---|
| | % Control (means) | |
| 8.8 | 10 | 10 |
| 17.5 | 20 | 55 |
| 35 | 68 | 70 |
| 70 | 95 | 77 |

TABLE 9

Efficacy of fluroxypyr-meptyl treatments on volunteer soybeans (GLXMA) with tank-mix adjuvant 21 days after application in the greenhouse (mean weed control).

| Rate (g ae/ha) | Starane ® Ultra | Extruded Granule + Agral 90 |
|---|---|---|
| | % Control (means) | |
| 8.8 | 5 | 8 |
| 17.5 | 8 | 13 |
| 35 | 25 | 32 |
| 70 | 53 | 43 |
| 140 | 73 | 66 |

TABLE 10

Efficacy of fluroxypyr-meptyl treatments on kochia (KCHSC) with tank-mix adjuvant 21 days after application in the greenhouse (mean weed control).

| Rate (g ae/ha) | Starane ® Ultra | Extruded Granule + Agral 90 |
|---|---|---|
| | % Control (means) | |
| 8.8 | 50 | 56 |
| 17.5 | 52 | 68 |
| 35 | 82 | 82 |
| 70 | 95 | 96 |
| 140 | 96 | 98 |

TABLE 11

Efficacy of fluroxypyr-meptyl treatments on wild buckwheat (POLCO) with tank-mix adjuvant 21 days after application in the greenhouse (mean weed control).

| Rate (g ae/ha) | Starane ® Ultra | Extruded Granule + Agral 90 |
|---|---|---|
| | % Control (means) | |
| 8.8 | 22 | 8 |
| 17.5 | 67 | 58 |
| 35 | 74 | 77 |
| 70 | 85 | 90 |
| 140 | 97 | 96 |

What is claimed:

1. A coated herbicide powder comprising crystalline particles of fluroxypyr-meptyl coated with a mixture of surfactants comprising:
   a) a water soluble nonionic surfactant comprising a polyvinyl alcohol; and
   b) a water soluble anionic surfactant comprising a lignosulfonate salt;
   wherein;
   the coated herbicide powder comprises from about 350 grams active ingredient per kilogram (gai/kg) to about 800 gai/kg of fluroxypyr-meptyl;
   the coated herbicide powder comprises from about 1 g/kg to about 100 g/kg of the water soluble nonionic surfactant;
   the coated herbicide powder comprises from about 10 g/kg to about 600 g/kg of water soluble nonionic surfactant;
   the fluroxypyr-meptyl has a degree of crystallinity of at least 80 percent; and
   the coated herbicidal powder does not contain sulfoxaflor or chlorpyrifos.

2. The powder of claim 1 comprising from about 500 gai/kg to about 700 gai/kg of fluroxypyr-meptyl.

3. The powder of claim 1 comprising from about 600 gai/kg to about 700 gai/kg of fluroxypyr-meptyl.

4. The powder of claim 1, wherein the water soluble nonionic surfactant is a polyvinyl alcohol with a degree of hydrolysis from about 87% to about 99%.

5. The powder of claim 4 in which the polyvinyl alcohol has a degree of hydrolysis from about 87% to about 89%.

6. The powder of claim 1 comprising from about 10 g/kg to about 50 g/kg of the water soluble nonionic surfactant.

7. The powder of claim 1, wherein the water soluble anionic surfactant is a lignosulfonate salt selected from a sodium lignosulfonate and/or a calcium lignosulfonate.

8. The powder of claim 1 comprising from about 50 g/kg to about 500 g/kg of the water soluble anionic surfactant.

9. The powder of claim 1 comprising from about 100 g/kg to about 400 g/kg of the water soluble anionic surfactant.

10. The powder of claim 1 in which the fluroxypyr-meptyl has a degree of crystallinity of at least 90 percent.

11. The powder of claim 1 in which the fluroxypyr-meptyl has a degree of crystallinity of at least 95 percent.

12. The powder of claim 1 further comprising one or more additional inert ingredients.

13. A high-load, herbicide granule which comprises:
    a) crystalline particles of fluroxypyr-meptyl coated with a mixture comprising:
       i. a water soluble nonionic surfactant comprising a polyvinyl alcohol; and
       ii. a water soluble anionic surfactant comprising a lignosulfonate salt; and
    b) particle agglomeration suppressant;
    wherein;
    the herbicide granule comprises from about 350 grams active ingredient per kilogram (gai/kg) to about 700 gai/kg of fluroxypyr-meptyl;
    the herbicide granule comprises from about 1 g/kg to about 100 g/kg of the water soluble nonionic surfactant;
    the herbicide granule comprise from about 10 g/kg to about 600 g/kg of the water soluble anionic surfactant;
    the fluroxypyr-meptyl has a degree of crystallinity of at least 80 percent; and
    the herbicide granule does not contain sulfoxaflor or chlorpyrifos.

14. The granule of claim 13 in which the herbicide granule is a water dispersible granule.

15. The granule of claim 13 comprising from about 350 gai/kg to about 600 gai/kg of fluroxypyr-meptyl.

16. The granule of claim 13 comprising from about 400 gai/kg to about 550 gai/kg of fluroxypyr-meptyl.

17. The granule of claim 13, wherein the water soluble nonionic surfactant is a polyvinyl alcohol with a degree of hydrolysis from about 87% to about 99%.

18. The granule of claim 17 in which the polyvinyl alcohol has a degree of hydrolysis from about 87% to about 89%.

19. The granule of claim 13 comprising from about 10 g/kg to about 50 g/kg of the water soluble nonionic surfactant.

20. The granule of claim 13, wherein the water soluble anionic surfactant is a lignosulfonate salt selected from a sodium lignosulfonate and/or a calcium lignosulfonate.

21. The granule of claim 13 comprising from about 50 g/kg to about 500 g/kg of the water soluble anionic surfactant.

22. The granule of claim 13 comprising from about 100 g/kg to about 400 g/kg of the water soluble anionic surfactant.

23. The granule of claim 13, wherein the particle agglomeration suppressant is an ionic compound selected from the group including an inorganic salt of an inorganic acid, an inorganic salt of an organic acid, and a nitrogen-containing compound such as a nitrogen fertilizer.

24. The granule of claim 23 in which the particle agglomeration suppressant is selected from the group including ammonium sulfate, ammonium nitrate, and potassium chloride.

25. The granule of claim 13, wherein the particle agglomeration suppressant is in an amount from about 20 g/kg to about 300 g/kg.

26. The granule of claim 25 comprising from about 20 g/kg to about 200 g/kg of the particle agglomeration suppressant.

27. The granule of claim 25 comprising from about 50 g/kg to about 150 g/kg of the particle agglomeration suppressant.

28. The granule of claim 13 further comprising one or more additional inert ingredients.

29. The granule of claim 13 in which the fluroxypyr-meptyl has a degree of crystallinity of at least 90 percent.

30. The granule of claim 13 in which the fluroxypyr-meptyl has a degree of crystallinity of at least 95 percent.

31. A high-load, herbicide granule obtainable by a process comprising:
   a) drying an oil-in-water emulsion comprising molten fluroxypyr-meptyl, a water soluble nonionic surfactant comprising a polyvinyl alcohol and a water soluble anionic surfactant comprising a lignosulfonate salt, to provide a coated herbicide powder comprising crystalline particles of fluroxypyr-meptyl coated with a mixture of the nonionic surfactant and the anionic surfactant, or
      dry-milling a solid mixture comprising fluroxypyr-meptyl, a water soluble anionic surfactant, a particle agglomeration suppressant, and, optionally, a water soluble nonionic surfactant, to provide a dry-milled herbicide powder;
   b) adding a particle agglomeration suppressant to the coated herbicide powder prepared in step a); and
   c) granulating the dry-milled herbicide powder prepared in step a) or the powder prepared in step b), and water wherein;
   the water soluble nonionic surfactant, if not added to the dry milled herbicide powder in a step a), is added to the dry-milled herbicide powder as a solution in water is step c);
   the herbicide granule comprises from about 350 grams active ingredient per kilogram (gai/kg) to about 700 gai/kg of fluroxypyr-meptyl;
   the herbicide granule comprises from about 1 g/kg to about 100 g/kg of the water soluble nonionic surfactant;
   the herbicide granule comprises from about 10 g/kg to about 600 g/kg of the water soluble anionic surfactant;
   the fluroxypyr-meptyl has a degree of crystallinity of at least 80 percent; and
   the herbicide granule does not contain sulfoxaflor or chlorpyrifos.

32. The granule of claim 31 in which the high-load herbicide granule is a water dispersible granule.

33. The granule of claim 31 comprising from about 350 gai/kg to about 600 gai/kg of fluroxypyr-meptyl.

34. The granule of claim 33 comprising from about 400 gai/kg to about 550 gai/kg of fluroxypyr-meptyl.

35. The granule of claim 31, wherein the water soluble nonionic surfactant is a polyvinyl alcohol with a degree of hydrolysis from about 87% to about 99%.

36. The granule of claim 35 in which the polyvinyl alcohol has a degree of hydrolysis from about 87% to about 89%.

37. The granule of claim 31 comprising from about 10 g/kg to about 50 g/kg of the water soluble nonionic surfactant.

38. The granule of claim 31, wherein the water soluble anionic surfactant is a lignosulfonate salt selected from a sodium lignosulfonate and/or a calcium lignosulfonate.

39. The granule of claim 31 comprising from about 50 g/kg to about 500 g/kg of the water soluble anionic surfactant.

40. The granule of claim 31 comprising from about 100 g/kg to about 400 g/kg of the water soluble anionic surfactant.

41. The granule of claim 31, wherein the particle agglomeration suppressant is an ionic compound selected from the group including an inorganic salt of an inorganic acid, an inorganic salt of an organic acid, and a nitrogen-containing compound such as a nitrogen fertilizer.

42. The granule of claim 41 in which the particle agglomeration suppressant is selected from the group including ammonium sulfate, ammonium nitrate, and potassium chloride.

43. The granule of claim 41 comprising from about 20 g/kg to about 300 g/kg of the particle agglomeration suppressant.

44. The granule of claim 43 comprising from about 20 g/kg to about 200 g/kg of the particle agglomeration suppressant.

45. The granule of claim 43 comprising from about 50 g/kg to about 150 g/kg of the particle agglomeration suppressant.

46. The granule of claim 31 further comprising one or more additional inert ingredients.

47. The granule of claim 31 in which the fluroxypyr-meptyl has a degree of crystallinity of at least 90 percent.

48. The granule of claim 31 in which the fluroxypyr-meptyl has a degree of crystallinity of at least 95 percent.

49. A method of controlling undesirable vegetation comprising applying to the vegetation or an area adjacent to the vegetation, or applying to the soil to prevent the emergence of the vegetation, a herbicidally effective amount of a spray solution in water containing the granule of claim 13.

50. A method of preparing the coated herbicide powder of claim 1 comprising:
   a) preparing a heated oil phase containing molten fluroxypyr-meptyl;
   b) preparing a heated aqueous containing the water soluble nonionic surfactant and the water soluble anionic surfactant;
   c) adding the heated, liquid oil phase prepared in step a) to the heated aqueous phase prepared in step b) under high shear homogenization to provide a microemulsion; and
   d) drying the microemulsion prepared in step c) to provide the coated herbicide powder.

51. A method of preparing the high-load herbicide granule of claim 31 comprising crystalline particles of fluroxypyr-meptyl coated with a mixture comprising: a water soluble nonionic surfactant; and a water soluble anionic surfactant and a particle agglomeration suppressant, comprising:
   a) mixing the dry-milled herbicide powder of claim 31 with one or more inert ingredients to provide a second herbicide powder;
   b) adding water with mixing to the second herbicide powder prepared in step a) to provide a wetted powder or dough;
   c) granulating the wetted powder or dough prepared in step b) by extrusion to provide wet granules; and
   d) drying the wet granules prepared in step c) to provide the high-load, herbicide granule.

52. A method of preparing the high-load herbicide granule of claim 13 comprising:
   a) providing a coated herbicide powder of comprising crystalline particles of fluroxypyr-meptyl coated with a mixture of surfactants comprising:
      a water soluble nonionic surfactant comprising a polyvinyl alcohol; and a water soluble anionic surfactant comprising a ligno-sulfonate salt;
wherein;
the coated herbicide powder comprises from about 350 grams active ingredient per kilogram (gai/kg) to about 800 gai/kg of fluroxypyr-meptyl;
the herbicide granule comprises from about 1 g/kg t about 100 g/kg of the water soluble nonionic surfactant;
the herbicide granule comprises from about 10 g/kg to about 600 g/kg of the water soluble anionic surfactant;
the fluroxypyr-meptyl has a degree of crystallinity of at least 80 percent; and
the herbicide granule does not contain sulfoxaflor or chlorpyrifos;
b) mixing the coated herbicide powder of step a) with one or more inert ingredients to provide a second herbicide powder;
c) adding water with mixing to the second herbicide powder prepared in step b) to provide a wetted powder or dough;
d) granulating the wetted powder or dough prepared in step c) by extrusion to provide wet granules; and
e) drying the wet granules prepared in step d) to provide the high-load, herbicide granule.

* * * * *